Patented Dec. 5, 1939

2,182,47

UNITED STATES PATENT OFFICE 2,182,479

LEAD OXIDE AND METHOD OF PREPARATION

James O. Johnstone, East Chicago, Ind., assignor to The Glidden Company, Cleveland, Ohio, a corporation of Ohio No Drawing. Application January 30, 1936, Serial No. 61,578

10 Claims. (Cl. 136—26)

This invention relates to lead oxide for use in lead storage batteries, and has particular reference to a new and improved lead oxide for this purpose which permits the formation of cool pastes of active material for the positive plates of lead storage battery. In particular, it contemplates the production of a lead oxide containing lead sulfate, probably rather basic, coated on the particles of the lead oxide, and a novel method of preparing this composition.

In the manufacture of storage batteries, it is common practice to make the positive plates in grid form, and make a paste of lead oxide, which is then filled into the grids. Some form of litharge is generally used for this purpose, preferably one containing substantial percentages of red lead; it is made into a paste with water and sufficient sulfuric acid to make a mixture containing 6 to 10% of normal lead sulfate, which is actually present as a larger percentage of basic sulfate. This reaction produces heat, which further accelerates the reaction. The hot paste removed from the mixer often sets before being pasted; and the entire pasting problem has been rendered difficult by the use of these hot pastes.

A further disadvantage of the paste method is that the reaction often becomes localized, and certain of the lead oxide is not wet until the acid is all used up, whereby even distribution of the sulfate through the mass of the oxide is not obtained.

It has been proposed to add separately prepared lead sulfate to battery oxide, in order to get a cool paste, eliminating the addition of a substantial portion of the sulfuric acid by this means. Such a paste is cool, but sufficiently even distribution of the lead sulfate through the mass cannot be attained, the sulfate remaining to some extent in clusters of particles easily observable under a microscope. The distribution is far inferior to that obtained with the hot paste method. Further, when the acid is added in the regular way there are often minute groups of particles which are excessively sulfated. These may be incompletely converted to active material during the formation. The material around these grains is excessively formed with the result that there is a sandy active material. As a result, the batteries made with this cold paste are inferior in action, because of this poor distribution of the active material in the positive plate.

I have discovered that it is possible to coat the individual particles of lead oxide powder with lead basic sulfate, by a rather simple process; and I have discovered further that this sulfate lead oxide can be made into a battery paste with water, with or without a small amount of sulfur acid, which is cool in working, which does n set rapidly during handling, and which has pe: fect distribution of the lead sulfate and oxid whereby better pasted positive plates can be ol tained for lead storage batteries.

My process comprises treating lead oxide wit a gaseous sulfur oxide in a furnace, reacting th lead oxide particles to form a basic lead sulfa thereon. Preferably I use $SO_2$, and a lead oxi containing a substantial percentage of red lea ($Pb_3O_4$), whereby the reaction proceeds as fo lows:

$$Pb_3O_4 + SO_2 = PbSO_4 + 2PbO$$

it being understood that an indeterminate bas sulfate is formed with part of the PbO.

In the preferred form of my invention, I tak litharge (PbO) and heat it in an oxidizing at mosphere to a temperature sufficiently high t oxidize part of the lead oxide to $Pb_3O_4$. Th reaction proceeds fairly well at 500° F., but I pre fer to operate substantially above this tempera ture to speed the reaction; the temperatur however, should not be above the decompositio point of red lead, about 900–925° F. In order t minimize the amount of $SO_2$ used, I prefer t roast the litharge to a read lead content of a least 5% before introducing the $SO_2$, as th $Pb_3O_4$ plus $SO_2$ reaction goes very slowly be low this point; and I find that optimum result are obtained by roasting to a substantially highe $Pb_3O_4$ content, in the range from 20 to 30% $Pb_3O_4$. Of course, air and $SO_2$ may be intro duced to get concurrent roasting and sulfation but there is rather a substantial stack loss o $SO_2$ during the early stages of the process, be fore substantial oxidation of the litharge oc curs.

A convenient source of $SO_2$ is a closed sulfu burned through which a stream of air is drawr although any source of $SO_2$ may be used, such as the roasting of sulfide ores, or pure $SO_2$ pur chased in cylinders.

The type of apparatus used for conductin; the reaction is of no particular importance. have found that an ordinary mechanically rab bled muffle furnace gives very satisfactory re sults; but hand rabbled muffles, and rotary muf fles might be used to good advantage.

I prefer to react the litharge to obtain re lead rather than use a thorough mechanica mixture of litharge and red lead, as in the forme se, each litharge particle has a coating of red
ad, while in the latter, the distribution of the
lfate will not be as uniform over the entire
:ide mixture. The distribution is, however, bet-
r than in the prior art methods, due to the fact
at the litharge is partially oxidized during the
urse of the reaction.

The product may also be made by reacting
harge with $SO_3$ at ordinary room tempera-
res or at low heats, but the reaction is more
pensive than the reaction of red lead with $SO_2$,
id does not proceed as smoothly.

As a typical example of my invention, I place
)00 pounds of litharge in a mechanically op-
ated oxidizing muffle furnace heated to 600°

The furnace was run for 5 hours, until the
d lead content was 8%. $SO_2$ was then intro-
iced from a sulfur burner, until the lead sul-
te content of the red lead was 7.7%. This re-
iired 96 pounds of $SO_2$, so that the absorption
$SO_2$ was 68% efficient.

This lead oxide was made up into a battery
.ste, using 100 parts of lead oxide to 12 parts
water at 80° F. The temperature rose to 92°
; the paste was workable; and grids pasted
erefrom gave satisfactory results.

When 100 parts of this oxide was mixed with 12
rts of water and 2 parts of sulfuric acid of
!5° specific gravity, the temperature rose to
0° F. The paste was slightly more plastic, and
ve a battery with slightly more initial capacity
an the straight water paste.

When 100 parts of an ordinary battery oxide,
ntaining 20% $Pb_3O_4$ was mixed with 9 parts of
iter and 9 parts of 1.25° specific gravity sul-
ric acid, the temperature rose to 140° F. The
ste, compared with the above sulfated oxide-
iter-sulfuric acid paste, contained about the
ne amount of lead sulfate, but was much more
istic, and less desirable for pasting, than the
ove paste. Batteries made with the hot paste
owed less initial capacity than with my cool
ste.

While I can produce various coated lead oxides
my method, I prefer to keep the lead sul-
:e content between 5 and 15%, optimum results
· battery work being obtained at a content of
to 10% lead sulfate. A considerably higher
itent of lead sulfate can, of course, be obtained
this method. The residue is a mixture of
harge and red lead, the ratios of which will vary
pending on the amount of roasting alone, and
ily controllable thereby. I prefer, for battery
rk, to keep the red lead content between 15
d 20%, although in special cases it may be de-
able to increase the read lead content as high
50%.

While I have shown but a few examples of
r invention, it contemplates broadly the prepa-
:ion of sulfate coated lead oxide particles which
are particularly adapted for battery work, and
the use thereof in battery pastes.

I claim:

1. A substantially dry composition compris-
ing lead oxide and basic lead sulfate, the lead
sulfate content being 5 to 15% calculated as nor-
mal lead sulfate, and being present as a coating
on individual particles of lead oxide.

2. A substantially dry composition comprising
lead oxide and basic lead sulfate, the lead sul-
fate content being 5 to 15% calculated as normal
lead sulfate, and being present as a coating on in-
dividual particles of lead oxide, the lead oxide
constituent being from 65 to 80 PbO and from
15 to 20 $Pb_3O_4$.

3. A substantially dry composition for use in
the manufacture of the active ingredients of the
positive plates of lead storage batteries, com-
prising lead oxide, and basic lead sulfate uniform-
ly distributed through the lead oxide, in the form
of a coating on particles of lead oxide, the lead
sulfate content of the composition being from
5 to 15%.

4. A paste for use in the positive plates of
storage batteries, comprising dilute sulfuric acid
mixed with a substantially dry composition com-
prising, lead oxide, and basic lead sulfate uni-
formly distributed through the lead oxide, in the
form of a coating on particles of lead oxide.

5. A paste for use in the positive plates of
storage batteries, comprising dilute sulfuric acid,
lead oxide, and basic lead sulfate uniformly dis-
tributed through the lead oxide, in the form of a
coating on particles of lead oxide, the lead sul-
fate content of the composition being from 5
to 15%.

6. The process of making a sulfate-coated lead
oxide which comprises reacting a mixture of
litharge and red lead with sulfur dioxide, by heat-
ing to a temperature of 500–900° F.

7. The process of making a sulfate-coated lead
oxide which comprises heating litharge to a tem-
perature of from 500–900° F., while subjecting it
to the action of oxygen and sulfur dioxide.

8. The process of making a sulfate-coated lead
oxide which comprises heating litharge to a tem-
perature of from 500–900° F., in the presence of
oxygen, until the $Pb_3O_4$ content is at least 5%,
and thereafter subjecting it to the action of sul-
fur dioxide.

9. The method of claim 8, in which the sulfur
dioxide is added in sufficient quantity to produce
a lead sulfate content of 5 to 15% in the fin-
ished product, calculated as normal lead sulfate.

10. A substantially dry composition comprising
individual particles of lead oxide coated with the
reaction product of $Pb_3O_4$ with a sulfur oxide
gas, at a temperature between 500° F. and 900° F.

JAMES O. JOHNSTONE.